United States Patent [19]
Meyer

[11] Patent Number: 4,884,932
[45] Date of Patent: Dec. 5, 1989

[54] DECKING INSULATION FASTENER

[76] Inventor: Eugene M. Meyer, 204 Mountain Park, Apt. C102, Issaquah, Wash. 98027

[21] Appl. No.: 44,708
[22] Filed: May 1, 1987
[51] Int. Cl.⁴ .......................... F16B 43/00; E04B 5/00
[52] U.S. Cl. ..................................... 411/373; 52/410; 52/512
[58] Field of Search ................ 411/373, 375, 371–372, 411/429–431, 369, 377, 910, 471, 472; 52/410, 512

[56] References Cited
U.S. PATENT DOCUMENTS

| Re. 27,085 | 3/1971 | Weidner. | |
|---|---|---|---|
| 1,872,149 | 8/1932 | Ledwinka. | |
| 2,538,483 | 1/1951 | Summers. | |
| 2,678,585 | 5/1954 | Ellis. | |
| 3,088,361 | 5/1963 | Hallock. | |
| 3,495,368 | 2/1970 | Kruase. | |
| 3,605,366 | 9/1971 | Zakim. | |
| 4,069,738 | 1/1978 | McClure. | |
| 4,074,501 | 2/1978 | Sandqvist. | |
| 4,161,854 | 7/1979 | Stelzer. | |
| 4,289,061 | 9/1981 | Emmett. | |
| 4,361,997 | 12/1982 | DeCaro. | |
| 4,380,413 | 4/1983 | Dewey | 52/410 |
| 4,476,660 | 10/1984 | Francovitch | 52/515 |
| 4,601,624 | 7/1986 | Hill | 411/373 |
| 4,621,230 | 11/1986 | Crouch et al. | 411/373 X |
| 4,625,469 | 12/1986 | Gentry et al. | 52/410 X |
| 4,630,422 | 12/1986 | Beneze | 411/369 X |
| 4,631,887 | 12/1986 | Francovitch | 52/410 |
| 4,686,808 | 8/1987 | Triplett | 52/512 X |

FOREIGN PATENT DOCUMENTS

| 1051168 | 3/1979 | Canada | 52/512 |
|---|---|---|---|
| 176968 | 4/1986 | European Pat. Off. | 411/386 |

Primary Examiner—Gary L. Smith
Assistant Examiner—Douglas E. Ringel
Attorney, Agent, or Firm—Christensen, O'Connor, Johnson & Kindness

[57] ABSTRACT

A two-piece fastener system for installing roofing insulation. The fastener system includes a round disk having a hub extending outwardly from the center of one side. The outwardly extending end of the hub includes an opening adapted to accommodate a threaded fastener or nail. A thermally insulating plug is driven into the cavity through an opening at its opposite end to abut against a head of the fastener, preventing it from backing out. In one embodiment, the plug is retained by a lip that extends thereabove, and in a second embodiment, is retained by engagement of a ridge in a corresponding groove.

15 Claims, 4 Drawing Sheets

DECKING INSULATION FASTENER

TECHNICAL FIELD

This invention generally pertains to a fastener for attaching a sheet-like material to an underlying surface and, more particularly, to a fastener adapted to attach insulation panels to a roof, wherein the fastener has a relatively large surface area and is attached to the roof by use of a screw or nail, the head of which is seated in a recessed cavity.

BACKGROUND INFORMATION

The rising cost of energy in recent years has created a need for improving the insulation properties of both new and replacement roof installations. This need has resulted in an increased use of rigid insulation panels as an underlayment to an outer waterproof roofing membrane.

Depending on the design of the roof and the "R-Factor" required, the insulation may comprise sheets of: expanded or extruded polystyrene (EPS), vermiculite particle board, wood fiber board, fiber glass, urethane foam board, poly isocyanurate, or phenolic foam. The insulating panels must be firmly attached to the supporting substrate or structure of the roof so that the top surface of the panels presents a smooth, unbroken surface over which the roofing membrane may be applied and adhered.

Prior art fasteners used to attach the insulating panels have included nails having relatively large diameter heads, nail and washer assemblies, and screw and washer assemblies. Relatively large diameter washers are typically used with fasteners for this purpose to distribute the compressive force holding the panels in place over a greater area, thereby reducing the likelihood that the fastener will pull through the insulating panel.

When subjected to the forces resulting from vibration and movement of the connected pieces, thermal expansion/contraction cycles, and swelling and shrinkage due to changes in the moisture content of the pieces, fasteners can loosen and back out of the material into which they are driven. This is particularly a problem in roofing applications because a metal fastener provides an excellent thermally conducting path for heat flow between the outer surface and the underlying roof structure that greatly enhances thermal expansion an contraction cycle-induced back out.

If a nail or screw used to fasten the insulating panel in place should back out of the substrate, the head of the fastener is likely to at least abrade the overlying roofing membrane, and may eventually pierce the membrane, causing a leak in the roof. To reduce back out problems, roofing nails are usually provided with annular ridges around their shanks to increase their coefficient of friction relative to the material into which they are driven. Moreover, since a threaded fastener is less susceptible to backout, it is generally considered the fastener of choice for attaching insulation panels. However, even a screw is subject to loosening as heat thermally bridges the insulation by conduction from the head of the screw into the shank portion driven into the substrate, causing expansion and contraction of the fastener. Even if the fastener used to attach the insulation panel backs out only a fraction of its length, any rough edges or burrs on the head of the fastener may eventually abrade through the overlying membrane, degrading its waterproof integrity.

Use of prior art metal fasteners for attaching insulation panels also inherently reduces the effectiveness of the insulation. Du to the relatively high coefficient of thermal conductivity of metal compared to that of the insulation panels, each metal fastener of the prior art type tends to bridge the thermal barrier provided by the insulation, conducting heat between the interior of the building and the exterior surface of the roof. In view of the number (or density) of prior art insulation panel fasteners typically used per panel, the reduction in the insulating effectiveness in the panels caused by thermal bridging through the fasteners may be significant.

If a metal fastener extends beyond a substrate into a poorly ventilated space, thermal bridging wherein heat is conducted from the space to the outer surface of the roof can cause moisture to condense on the exposed end of the fastener because it is colder than the air in the space. Should the condensate drip onto an underlying surface, it can cause damage, e.g. water spots on interior ceiling tile. In addition, moisture collected on the fastener may also cause corrosion, perhaps resulting in eventual failure of the fastener.

The present invention is directed to reducing the above-described problems of conventional prior art fasteners used for attaching roofing insulation panels. The benefits and advantages that it provides compared to prior art fasteners will be apparent from the attached drawings and the description of the preferred embodiment which follows hereinbelow.

SUMMARY OF THE INVENTION

The present invention is a fastener system for use in attaching a sheet-like material to an underlying substrate. The fastener system comprises a generally flat plate having a central hub portion that extends outwardly on one side. The hub portion includes a central elongate cavity having a first opening disposed at the outwardly extending end of the hub portion. The first opening is adapted to accommodate a shank of a fastener, e.g. a nail or screw, that is driven therethrough into an underlying substrate. At the opposite end of the cavity is a second opening which is larger than the first.

Driving the fastener into the underlying substrate draws the flat plate against the outer surface of the sheet-like material, clamping it against the substrate. Thereafter, an elongate plug having a coefficient of heat transfer characteristic of a thermal insulator is forcibly driven into the cavity through the second opening, and is held therein by means for retaining the plug in the cavity. Both the second opening and the cavity are generally round in shape and sized to accommodate the plug, which comprises a generally truncate conic section, tapered to a smaller diameter at one end than at the other. Once the plug is driven into the cavity, the end having the larger diameter is disposed adjacent the second opening.

In a first embodiment, the means for retaining the plug in the cavity comprise a rib and a corresponding groove disposed on adjacent surfaces of the cavity and the side of the plug. The rib engages the groove when the plug is driven into the cavity thereby retaining it in place.

In a second embodiment, the means for retaining the plug in the cavity comprise a lip extending radially inward above the cavity to define the second opening. The diameter of the second opening in this embodiment is substantially smaller than the diameter of the larger end of the plug, so that when the plug is driven through the second opening, past the lip, it is retained by the lip which then extends above the plug. The second embodiment further includes a nib projecting at the larger diameter end of the plug, which extends through the second opening once the plug is seated within the cavity.

After the plug is driven into the cavity, it physically prevents the fastener from backing out of the substrate, and in addition, acts as an insulator to prevent thermal bridging, interrupting heat flow between the head of the fastener and an outer surface. This prevents many of the problems previously noted hereinabove that result from the use of prior art fasteners wherein the thermal conductivity of the metal used in the fastener effects thermal bridging through the insulation layer.

DISCLOSURE OF THE PREFERRED EMBODIMENTS

Figure 1:
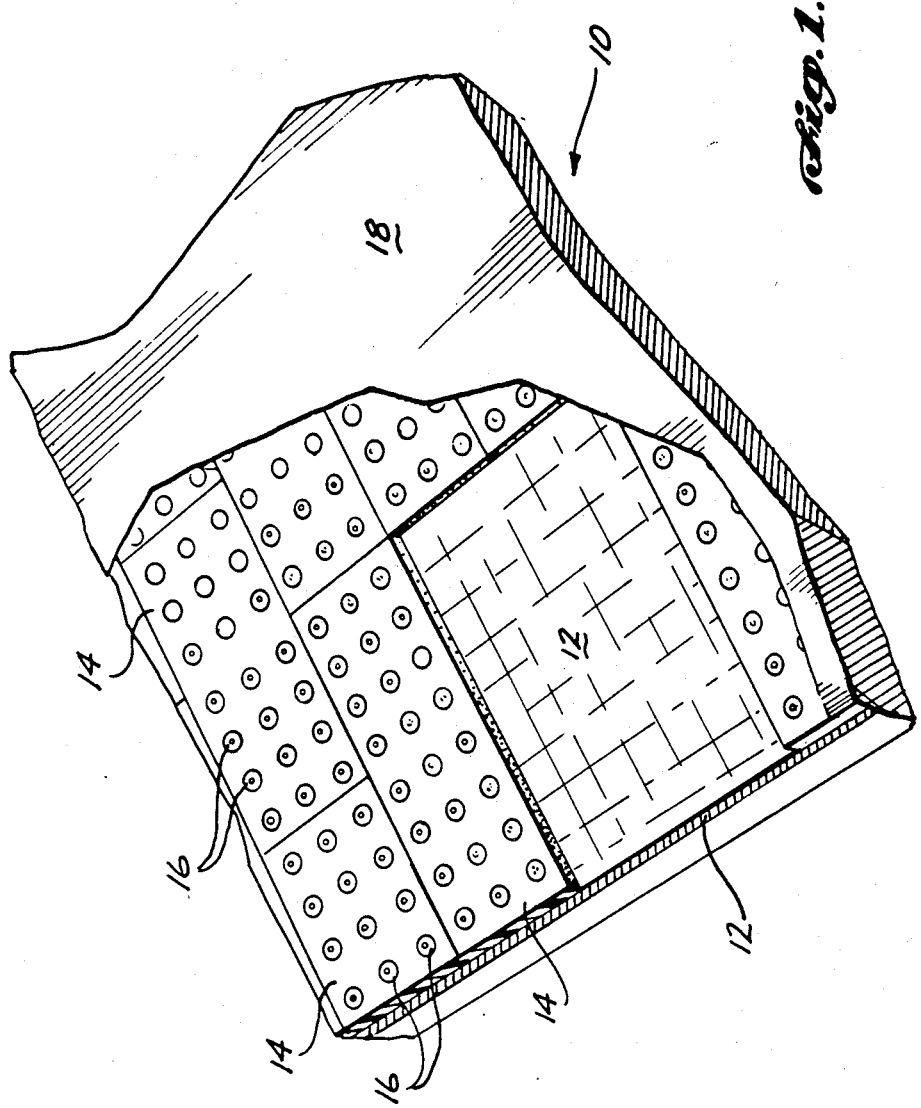
FIG. 1 is a perspective view of a portion of a roof, partially cutaway to show the present invention in use for fastening a plurality of insulation panels to an underlying, older roof surface.

With reference to FIG. 1, a section of a building roof is generally denoted by reference numeral 10, cutaway to show an underlying substrate 12. Roof 10 has been insulated using a plurality of insulating panels 14. As noted above, insulating panels 14 may comprise a variety of materials formed in rigid sheet-like boards. Insulation panels 14 are laid in a staggered pattern over substrate 12, e.g., an older roofing material, with their edges in abutting relationship. A plurality of fastening systems 16, comprising a first embodiment of the present invention are installed in spaced apart array over the upper surface of insulation panels 14 and thus serve to attach panels 14 to the underlying substrate.

If roof 10 were being applied to new construction, reference numeral 12 might denote a plywood sheathing, or might be a plurality of closely spaced wooden or metal stringers extending across roof 10. It will be apparent that the present invention can be used to fasten insulation panels 14 to virtually any underlying surface generally defining a plane, so long as that surface will accept either a nail, screw, or other appropriate fastener.

Figure 2:
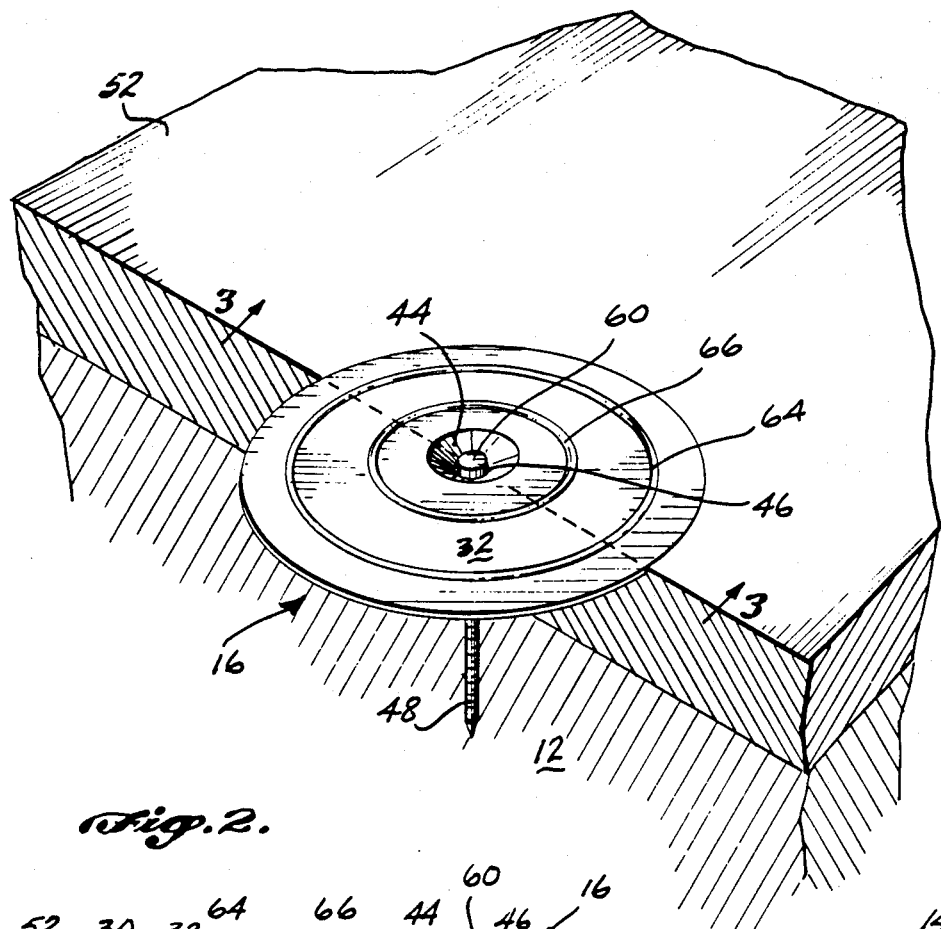
FIG. 2 is a perspective view showing a first embodiment of the subject invention applied to hold an insulation panel on a substrate (both cut away).
Figure 3:
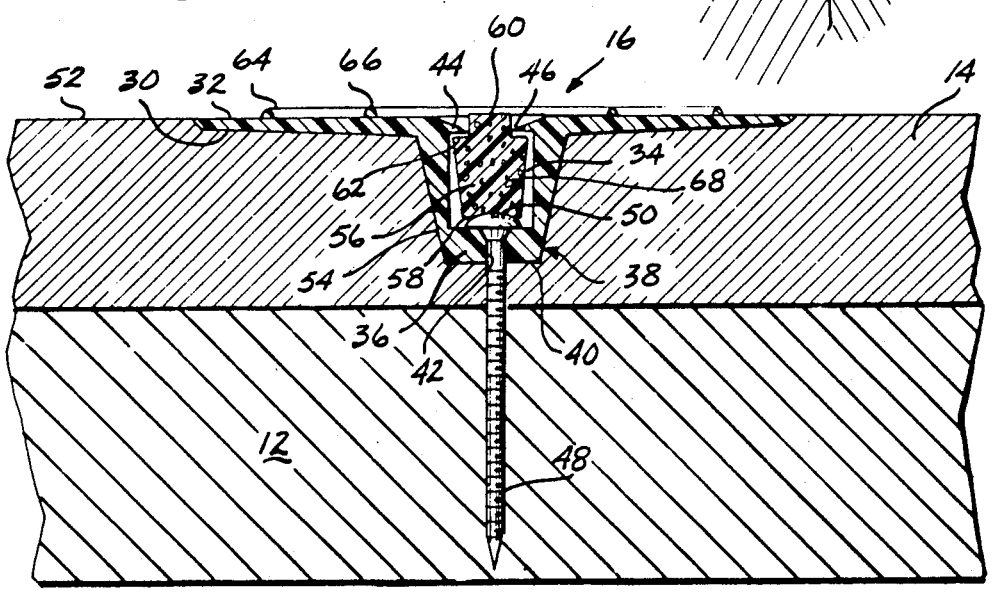
FIG. 3 is a cross-sectional view of the first embodiment, taken along cross section lines 3—3 in FIG. 2.

Turning now to FIGS. 2 and 3, the first embodiment 16 of the present invention is shown in greater detail. Fastener system 16 appears as a flat disk when viewed from above. In the preferred embodiment, a lower surface 30 of fastener system 16 extends over approximately seven square inches of the underlying insulator panel 14. The compression force of surface 30 against the top 52 of insulation panel 14 is thus spread over a large area, minimizing the risk of "pull-through." The upper surface 32 of the disk is generally flat and coextensive with the plane defined by top 52 of panel 14.

An elongate cavity 34 is formed inside a central hub 36 that projects outwardly from lower surface 30 of fastening system 16. The outer surface 38 of hub 36 tapers inwardly toward a lower end 40. Centered within end 40 is an opening 42 which is sized to accommodate the shank of a fastener, such as screw 48. In use, the fastener is inserted through opening 42 and driven into the underlying substrate 12. As shown in FIG. 3, screw 48 has been driven into substrate 12 a sufficient distance so that hub 36 of fastener system 16 is drawn into or seated within insulating panel 14. This occurs as the head 50 of screw 48 contacts the interior of cavity 34 at end 40, drawing the hub down into the insulation panel 14 and compressing the insulating panel in a direction aligned with the axis of screw 48. The fastener is driven into substrate 12 until the lower surface 30 of the fastener system 16 contacts and compresses downwardly the top surface 52 of insulating panel 14. When insulation panels 14 comprise a material that is too hard to be compressed by hub 36, a countersunk recess 54 may be out or drilled into the insulation prior to installation of the fastener system 16. Formation of such a countersunk recess 54 is unnecessary for most insulating panels 14, due to the relatively "soft," compressible nature of the insulation. By thus providing a countersunk installation, the length of a moment arm represented by the distance between the top of substrate 12 and head 50 of screw 48 is substantially reduced, thereby minimizing the risk of lateral movement of insulation panel 14 relative to substrate 12 due to vibration and movement of the underlying framework (not shown).

Once the fastener 48 is installed, thus clamping insulation panel 14 in place between the disk's lower surface 30 and the substrate 12, a tapered plug 56 is driven into cavity 34 through opening 46, until a shoulder 62 at the top of plug 56 is seated beneath an inwardly extending lip 44. Lip 44 is disposed at the top of cavity 34, around its center, and defines opening 46 as being circular in shape, with a diameter smaller than the outer circumference of shoulder 62. As a result, lip 44 is elastically distorted downwardly into the cavity 34 as plug 56 is driven therein. However, because fastener system 16 is formed from a relative resilient plastic material such as polypropylene, lip 44 returns to its inwardly extending position above shoulder 62, acting to retain plug 56 within cavity 34. Lip 44 is tapered so that it is relatively thinner on its radially inwardly extending edge, thereby improving the ease by which plug 56 may be driven into cavity 34.

Once shoulder 62 of plug 56 is fully seated below lip 44, the smaller diameter lower end of plug 56 abuts head 50 of screw 48. Thus, plug 56 physicallY prevents screw 48 from backing out of substrate 12 through opening 42.

A driving head or nib 60 is disposed on the top of plug 56 and projects upwardly through opening 46 helping to seal that opening, preventing moisture from leaking past lip 44 and shoulder 62. Moisture in cavity 34 might freeze, forcing plug 56 upwardly. Nib 60 also provides a projecting surface which may be struck with a hammer to assist in fully seating plug 56 within cavity 34, and helps to fill in the void created by the tapering of lips 44 toward their inner edge.

Figure 4:
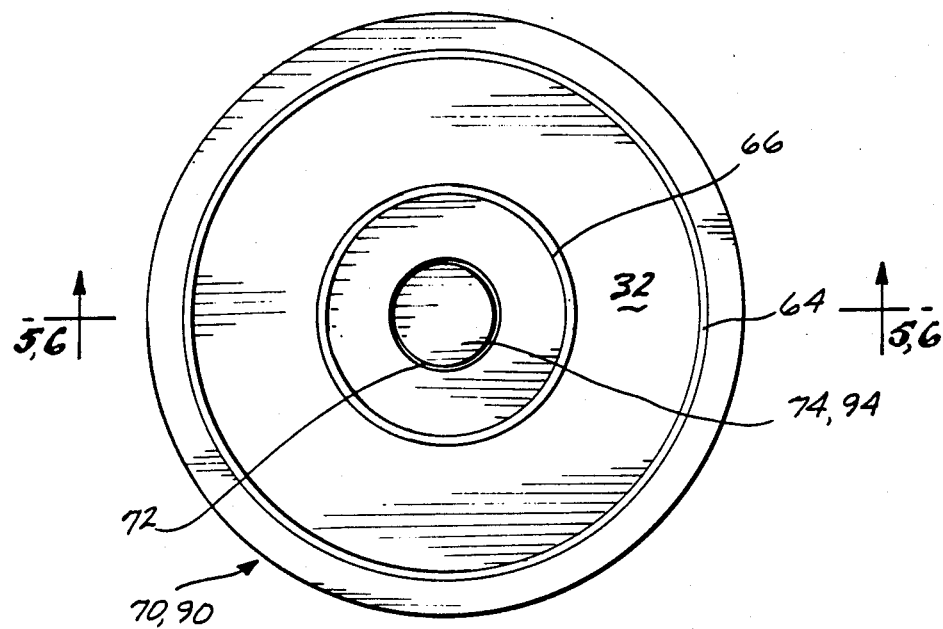
FIG. 4 is a plan view of the upper exposed surface of the second and third embodiments of the present invention.
Figure 5:
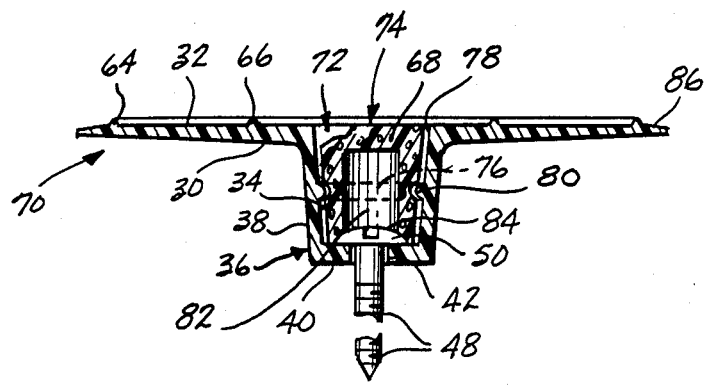
FIG. 5 is a cross-sectional view of the second embodiment, taken a cross section line 5—5 of FIG. 4.

As shown in FIGS. 4 and 5, a second embodiment of the fastener system is generally denoted by reference numeral 70. Elements of common function and structure are represented by the same reference numerals on all embodiments of the present fastener system. The primary difference between the two embodiments 16 and 70 lies in the means by which the tapered plug 74 is retained within central cavity 34. Fastener system 70 does not include lip 44. Instead, an opening 72 at the top of cavity 34 is substantially the same diameter as the top of tapered plug 74. After a fastener is inserted through opening 42 and driven into the substrate, plug 74 is inserted through opening 72 and forcibly driven into place, i.e., by striking it with a hammer, until a bottom 84 of plug 74 abuts against the top of threaded fastener 48. An annular groove 76 is formed on the plug and is sized and disposed to accommodate a corresponding ridge 80 formed on sidewall 78 of cavity 34 when plug 74 is thus fully driven into the cavity. Ridge 80 may extend completely around the circumference of cavity 34 or may comprise a plurality of spaced apart segments. Engagement of the ridge(s) 80 within groove 76 retains plug 74 within cavity 34.

Although illustrated in FIG. 5 as having a diameter at any given elevation which is slightly smaller than the diameter of cavity 34, plug 74 preferably has a diameter which is slightly larger, for example, 0.001 inches larger in diameter. The oversize fit of plug 74 within cavity 34 assures a tight seal, preventing moisture from seeping into the cavity. Tapered plug 74 includes a central void 82, and is not solid as is plug 56. Void 82 helps to improve the thermal insulation characteristics of plug 74, compared to the solid design of plug 56.

Figure 6:
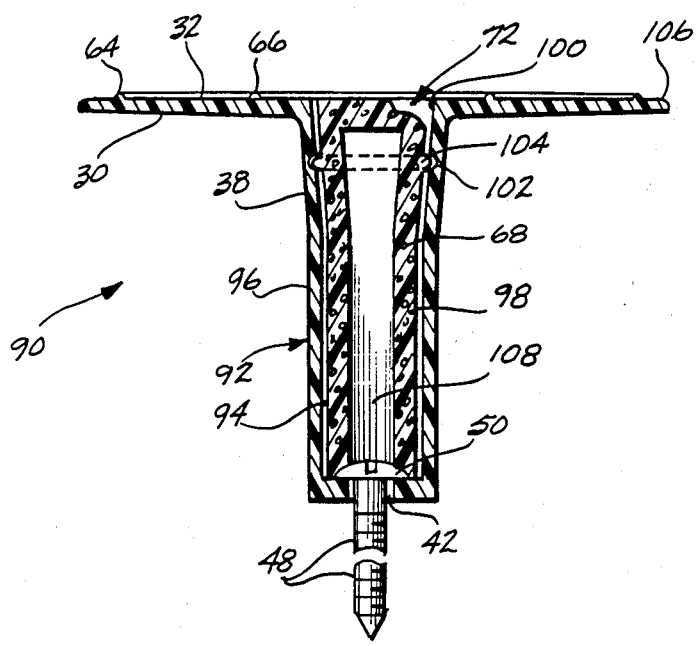
FIG. 6 a cross-sectional view of the third embodiment, analogous to the view of the second embodiment shown in FIG. 5, taken along cross-sectional line 6—6 of FIG. 4.

Referring now to FIG. 6, a third fastener system is generally denoted by reference numeral 90. The third embodiment 90 includes a central hub 92 extending from the disk's lower surface 30, which is substantially longer than hub 36. The additional length provided by hub 92 permits fastener system 90 to be used with insulation panels having a relatively greater thickness than those used with fastener systems 16 or 70. A central cavity 94 is formed within hub 92 and has a correspondingly longer length than cavity 34 of the first and second embodiments. Inside cavity 94 is disposed a tapered plug 98 that extends from the upper surface 32 downwardly into the cavity to abut against the head of an installed fastener, e.g., head 50 of screw 48.

The means for retaining plug 98 within cavity 94 are similar to groove 76 and ridge 80 provided in the second embodiment of FIG. 5; however, in the third embodiment illustrated in FIG. 6, an annular groove 102 is formed in the sidewall 100 of cavity 94 so as to engage a ridge 104 formed on the outer surface of plug 98 when the plug is fully seated within the cavity. Again, it will be apparent that ridge 104 may comprise a plurality of spaced apart segments disposed around the circumference of tapered plug 98 rather than a single, continuous annular ridge. Engagement of ridge 104 within groove 102 not only retains plug 98 within cavity 94, it also acts to prevent the fastener against which the plug 98 abuts from backing out through the opening 42. A central void 108 is also molded into plug 98 to improve its thermal insulating characteristic (although it may be molded without a void.)

Each of tapered plugs 56, 74, and 98 comprise a thermally insulating material having a relatively low coefficient of heat transfer (much lower than that of most metals). In the preferred embodiments, plugs 56, 74 and 98 are molded from polypropylene or nylon in which air has been entrained to form bubbles 68. Entrainment of bubbles 68 both reduces the shrinkage of the plug within a mold used to manufacture it and improves the thermal insulating characteristics of the involved plastic.

The top surfaces 32 of each of the three embodiments of the subject invention disclosed hereinabove are normally covered by a waterproof membrane 18 comprising either a rubber, plastic, or asphalt base material. Membrane 18 may be loosely laid over the insulating panels 14 and top surfaces 32 of the fastener system and weighted down with decorative gravel or other material, or may be adherently attached by means of a suitable mastic or adhesive applied to the insulating panels 14, or already provided on the under surface of the roofing membrane. An outer and inner annular ridge 64 and 66, respectively, are provided on upper surface 32 to retain the mastic, preventing the mastic being squeezed off the surface when the roofing membrane 18 is set and rolled with a pressure roller. The retained mastic provides an effective adherence with the membranes, acts as a waterproof seal, and prevents the creation of a void on surface 32.

The periphery of the subject fastener system is tapered as shown at 86 in FIG. 5, or smoothly rounded as shown at 106 in FIG. 6 to prevent any sharp edges that might abrade through the overlying roofing membrane 18. Since the head of the fasteners (e.g., head 50) is seated deeply within either cavity 34 or 94, there is virtually no chance that any burrs or sharp edges on the fastener may abrade through the overlying membrane 18.

Fastener systems 16, 70 and 90 substantially reduce thermal bridging and physically prevent any fastener with which they are used from backing out and piercing an overlying roofing membrane. Not only do they protect the waterproof integrity of the membrane, they also minimize the degradation of the insulating properties of the insulation panels that would otherwise occur due to thermal bridging through the fastener.

Although the invention has been disclosed with regard to several preferred embodiments and modifications thereto, it will be apparent to those skilled in the art that further modifications may be made to the invention within the scope of the claims that follow hereinbelow. Accordingly, it is not intended that the invention be limited by the disclosure or by such modifications, but instead that its scope should be determined entirely by reference to these claims.

The embodiments of the invention in which an exclusive property or privilege is claimed are defined as follows:

1. A fastener system comprising:
   a generally flat plate having an upper surface and a lower surface, a central hub portion extending downwardly from the lower surface thereof, the hub portion including a central elongate cavity having a first opening disposed at the downwardly extending end of the hub portion distal from the lower surface, the first opening being adapted to accommodate a shank of a fastener driven therethrough, an opposite end of the cavity including a second opening disposed in the plate and larger than the first opening;
   an elongate solid plug having a projecting driving head allowing the plug to be forcibly driven into the cavity through the second opening, into abutment with the fastener, a shoulder on the plug being below the upper surface of the plate; and means comprising a resilient lip for retaining the plug in the cavity and sealingly engaging the driving head, preventing the fastener from backing out of the first opening.

2. The fastener system of claim 1 wherein the flat plate and the elongate hub comprise a resilient plastic material.

3. The fastener system of claim 1 wherein the plug comprises a material having a low coefficient of heat transfer so that the plug is a thermal insulator.

4. The fastener system of claim 1 wherein the second opening and the cavity are generally round and wherein the plug generally comprises a truncate conic section, tapered to a smaller diameter at one end than at the other, the one end having a diameter smaller than that of the second opening and the other end of the plug having a diameter substantially equal to that of the cavity at an end thereof disposed adjacent the second opening.

5. The fastener system of claim 1 wherein the lip extends radially inward at an upper end of the cavity to define the second opening and is thinner at a circumference where it defines the second opening than at a greater circumference.

6. The fastener system of claim 1 wherein the hub portion is tapered toward its downwardly extending end.

7. A fastener system for attaching a sheet-like material to a substrate with a fastener, comprising:

a disk having a generally flat upper surface and a diameter substantially greater than its thickness and including cavity means projecting axially downwardly from a lower surface of the disk, along its central axis, for defining a cavity enclosing a head of the fastener as the fastener is driven into the substrate through a first and a second opening in the cavity means, to draw the lower surface of the disk against the sheet-like material, thereby clamping the material between the disk and the substrate;

plug means, drivingly seated within the cavity means and below the upper surface of the disk in contact with the fastener, for retaining the fastener to prevent it backing out, said plug means comprising a generally truncate conic section, tapered to a smaller diameter at one end than at the other, said one end having a diameter smaller than that of the second opening and the other end of the truncate conic section having a diameter substantially equal to that of the cavity adjacent the second opening; and means for thermally insulating the head of the fastener.

8. The fastener system of claim 7 wherein the truncate conic section is driven into the cavity through the second opening.

9. The fastener system of claim 8 wherein the cavity includes a lip disposed at one end of the cavity, said lip defining the second opening, the lip being elastically deformed by the truncate conic section as it is driven into the cavity through the second opening, a radially inner edge of the lip extending over the truncate conic section to retain it within the cavity after it is driven past the inner edge of the lip.

10. The fastener system of claim 8 wherein a ridge and a mating groove are disposed on adjacent surfaces of the truncate conic section and the cavity, the ridge engaging the groove to retain the truncate conic section in the cavity.

11. The fastener system of claim 7 wherein the disk comprises a resilient plastic and the means for thermally insulating the head of the fastener comprise an air injected plastic.

12. The fastener system of claim 7 wherein the cavity is tapered toward the disk central axis to accommodate the plug means in a tight fit.

13. The fastener system of claim 7 wherein the sheet-like material is a thermal insulator.

14. The fastener system of claim 7 wherein the cavity is countersunk in to the sheet-like material as the material is clamped between the disk and the substrate.

15. The fastener system of claim 7 wherein an upper surface of the disk is substantially flush with a surface of the sheet-like material and is adapted to be covered with a waterproof membrane.

* * * * *

UNITED STATES PATENT AND TRADEMARK OFFICE
CERTIFICATE OF CORRECTION

PATENT NO. : 4,884,932

DATED : December 5, 1989

INVENTOR(S) : Eugene M. Meyer

Page 1 of 2

It is certified that error appears in the above-identified patent and that said Letters Patent is hereby corrected as shown below:

| Column | Line | Error |
|---|---|---|
| Section [56], 6th Reference | | "Kruase" should be --Krause-- |
| 1 | 49 | "an" should be --and-- |
| 2 | 5 | "Du" should be --Due-- |
| 3 | 33 | "a" should be --along-- |
| 4 | 26 | "out" should be --cut-- |
| 4 | 58 | "physicallY" should be --physically-- |
| 5 | 41 | "!6" should be --16-- |
| 5 | 48 | "Within" should be --within-- |
| 5 | 51 | "!02" should be --102-- |
| 5 | 52 | "!00" should be --100-- |
| 5 | 53 | "!04" should be --104-- |
| 5 | 62 | "!08" should be --108-- |
| 6 | 9 | "!8" should be --18-- |
| 6 | 12 | "tOp" should be --top-- |
| 6 | 20 | "!8" should be --18-- |
| 6 | 27 | "!06" should be --106-- |
| 6 | 34 | "!6" should be --16-- |
| 6 | 64; Claim 1, line 11 | "opening" should be --opening,-- |

UNITED STATES PATENT AND TRADEMARK OFFICE
CERTIFICATE OF CORRECTION

PATENT NO. : 4,884,932

DATED : December 5, 1989

INVENTOR(S) : Eugene M. Meyer

Page 2 of 2

It is certified that error appears in the above-identified patent and that said Letters Patent is hereby corrected as shown below:

Column  Line 8    38; Claim 14, line 2    "in to" should be --into--.

Signed and Sealed this

Fourth Day of December, 1990

Attest:

HARRY F. MANBECK, JR.

Attesting Officer

Commissioner of Patents and Trademarks